(12) United States Patent
Hashimoto

(10) Patent No.: US 10,899,406 B2
(45) Date of Patent: Jan. 26, 2021

(54) LIGHTING SYSTEM FOR A LEANING VEHICLE

(71) Applicant: Peymon Hashimoto, Arlington, TX (US)

(72) Inventor: Peymon Hashimoto, Arlington, TX (US)

( * ) Notice: Subject to any disclaimer, the term of this patent is extended or adjusted under 35 U.S.C. 154(b) by 0 days.

(21) Appl. No.: 16/853,443

(22) Filed: Apr. 20, 2020

(65) Prior Publication Data

US 2020/0247493 A1 Aug. 6, 2020

Related U.S. Application Data

(63) Continuation-in-part of application No. 16/179,407, filed on Nov. 2, 2018, now Pat. No. 10,661,703.

(60) Provisional application No. 62/643,354, filed on Mar. 15, 2018.

(51) Int. Cl.
*B62J 6/023* (2020.01)
*F21S 41/675* (2018.01)
*B60Q 1/115* (2006.01)

(52) U.S. Cl.
CPC ............... *B62J 6/023* (2020.02); *B60Q 1/115* (2013.01); *F21S 41/675* (2018.01)

(58) Field of Classification Search
CPC ........ B60Q 1/124; B60Q 1/122; B60Q 1/085; B60Q 23/122; F21V 21/30; B62J 6/02
See application file for complete search history.

(56) References Cited

U.S. PATENT DOCUMENTS

2005/0270785 A1* 12/2005 Gropp ..................... F21S 41/62
362/475
2010/0168966 A1* 7/2010 Tsujii ......................... B62J 6/02
701/48

* cited by examiner

*Primary Examiner* — Joseph L Williams
(74) *Attorney, Agent, or Firm* — Patent Grove LLC; Tomas Friend

(57) ABSTRACT

A lighting system for a leaning vehicle includes a pivot frame configured to be fixed to a light emitting and/or light reflective device, a mount configured to be fixed to a light fitting, and a motor attached to the pivot frame and the mount. The motor is configured to provide rotational movement of the pivot frame relative to the mount. A controller in electrical communication with the motor is configured to receive sensor data of a leaning angle of the leaning vehicle and control the motor to rotate the pivot frame to a desired angle relative to the mount based on the leaning angle.

21 Claims, 11 Drawing Sheets

LIGHTING SYSTEM FOR A LEANING VEHICLE

CROSS REFERENCE TO RELATED APPLICATIONS

This application in a continuation-in-part of U.S. Ser. No. 16/179,407 filed Nov. 2, 2018, which claim priority to U.S. 62/643,354 filed Mar. 15, 2018. PCT/US19/22285 claims priority to U.S. Ser. No. 16/179,407 filed Nov. 2, 2018.

STATEMENT REGARDING FEDERALLY FUNDED DEVELOPMENT

This invention was not made with any Federal or State government support.

BACKGROUND OF THE INVENTION

Various lighting systems for vehicles that lean, bank, or otherwise undergo significant changes in driving position are known. Such vehicles may include motorcycles, scooters, mopeds, etc. One of the problems commonly associated with driving e.g. a motorcycle is limited use when the light is needed to illuminate the road. For example, as a rider turns and thereby tilts the motorcycle, the light no longer lights the ideal path for the rider, which has negative impact on the safety of driving the motorcycle. Accordingly, although great strides have been made in the area of motorcycle lighting systems, many shortcomings remain.

Problems with existing solutions for adapting the light as the motorcycle's position varies in relation to the road include complex and expensive solutions, which are also cumbersome to fit or retrofit to headlight assemblies of modern motorcycles which often are compact and have a great design variability.

BRIEF SUMMARY OF THE INVENTION

It is an object of the invention to at least partly overcome one or more limitations of the prior art. In particular, it is an object to provide an improved lighting system for leaning vehicles, such as motorcycles, in particular allowing for a facilitated fit or retrofit to a wider range of headlight assemblies, while being less complex and costly to manufacture.

In a first aspect of the invention, this is achieved by a lighting system for a leaning vehicle, comprising a pivot frame configured to be fixed to a light emitting and/or light reflective device, a mount configured to be fixed to a light fitting of a leaning vehicle, a motor attached to the pivot frame and the mount, wherein the motor is configured to provide rotational movement of the pivot frame relative to the mount, and a controller in electrical communication with the motor and being configured to receive sensor data of a leaning angle of the leaning vehicle, and wherein the controller is configured to control the motor to rotate the pivot frame to a desired angle relative to the mount based on the leaning angle.

In a second aspect of the invention, this is achieved by a method of lighting control in a lighting system for a leaning vehicle. The lighting system comprises a pivot frame configured to be fixed to a light emitting and/or light reflective device, a mount configured to be fixed to a light fitting of a leaning vehicle, and a motor attached to the pivot frame and the mount and being configured to provide rotational movement of the pivot frame relative to the mount, the method comprising receiving sensor data of a leaning angle of the leaning vehicle, rotating the pivot frame to a desired angle relative to the mount based on the leaning angle.

In a third aspect of the invention, this is achieved by a method of providing lighting for a leaning vehicle. The method comprises providing a lighting system comprising a pivot frame configured to be fixed to a light emitting and/or light reflective device, a mount configured to be fixed to a light fitting of a leaning vehicle, and a motor attached to the pivot frame and the mount and being configured to provide rotational movement of the pivot frame relative to the mount, securing the mount to a light fitting of the leaning vehicle, connecting an electrical connection interface, in communication with a controller and/or in communication with the light emitting device to an electrical system of the leaning vehicle, wherein the controller is configured to control the motor to rotate the pivot frame to a desired angle relative to the mount based on sensor data of a leaning angle of the leaning vehicle.

Further examples of the invention are defined in the dependent claims, wherein features for the first aspect may be implemented for the second and subsequent aspects, and vice versa.

Having a pivot frame configured to be fixed to a light emitting and/or light reflective device, a mount configured to be fixed to a light fitting of a leaning vehicle, a motor attached to the pivot frame and the mount to rotate the pivot frame relative to the mount in response to sensor data of a leaning angle (v) of the leaning vehicle provides a compact and less complex light system that facilitates fit or retrofit to a wide range of headlight assemblies for vehicles such as motorcycles, scooters, mopeds, etc. ATV's, water craft, and three-wheelers.

Still other objectives, features, aspects and advantages of the invention will appear from the following detailed description as well as from the drawings.

BRIEF DESCRIPTION OF THE DRAWINGS

The elements of the drawings are not necessarily to scale relative to each other, usually in order to enhance clarity, with emphasis placed instead upon clearly illustrating the principles of the disclosure. Like reference numerals designate corresponding parts throughout the several views of the drawings in which.

DETAILED DESCRIPTION OF THE INVENTION

Embodiments of the invention will now be described more fully hereinafter with reference to the accompanying drawings, in which some, but not all, embodiments of the invention are shown. The invention may be embodied in many different forms and should not be construed as limited to the embodiments set forth herein.

Figure 1:
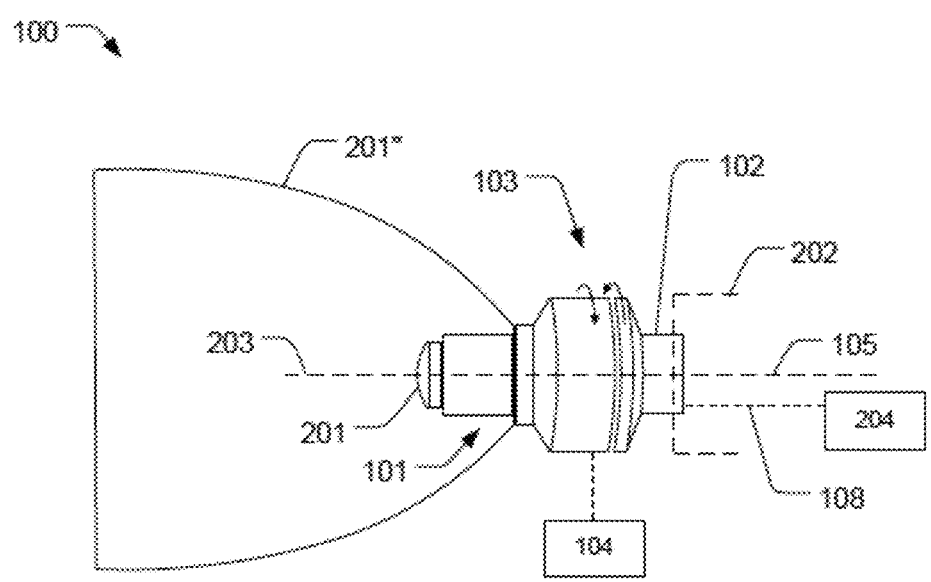
FIG. 1 is a schematic illustration, in a cross-sectional side view, of a lighting system according to an example of the disclosure.
Figure 2A:
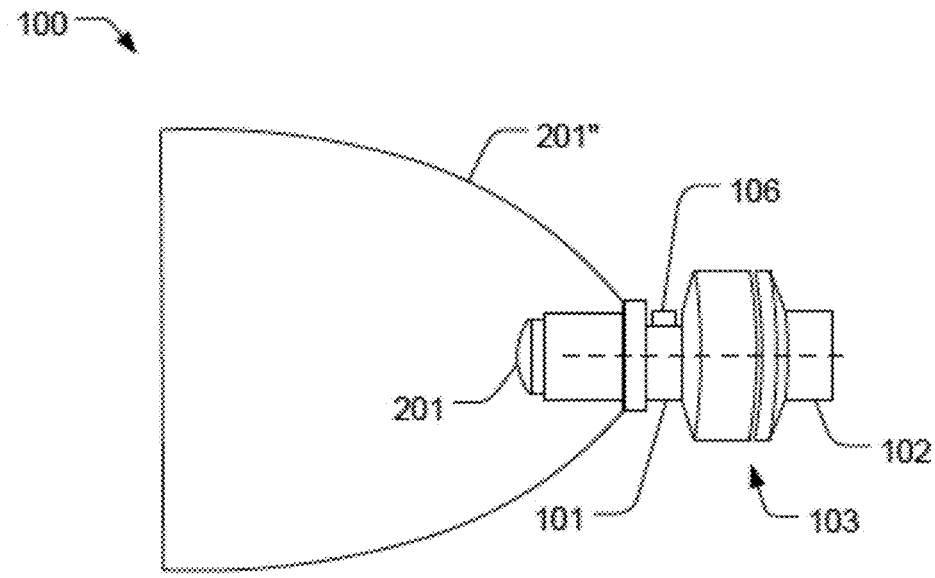
FIGS. 2a and 2b are schematic illustrations, in a cross-sectional side views, of a lighting system according to examples of the disclosure.
Figure 2B:
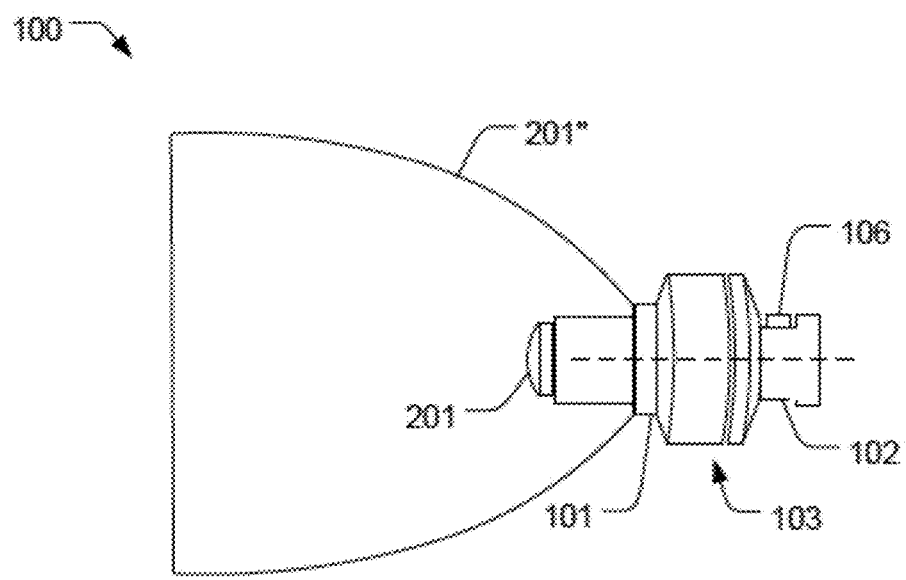
Figure 3A:
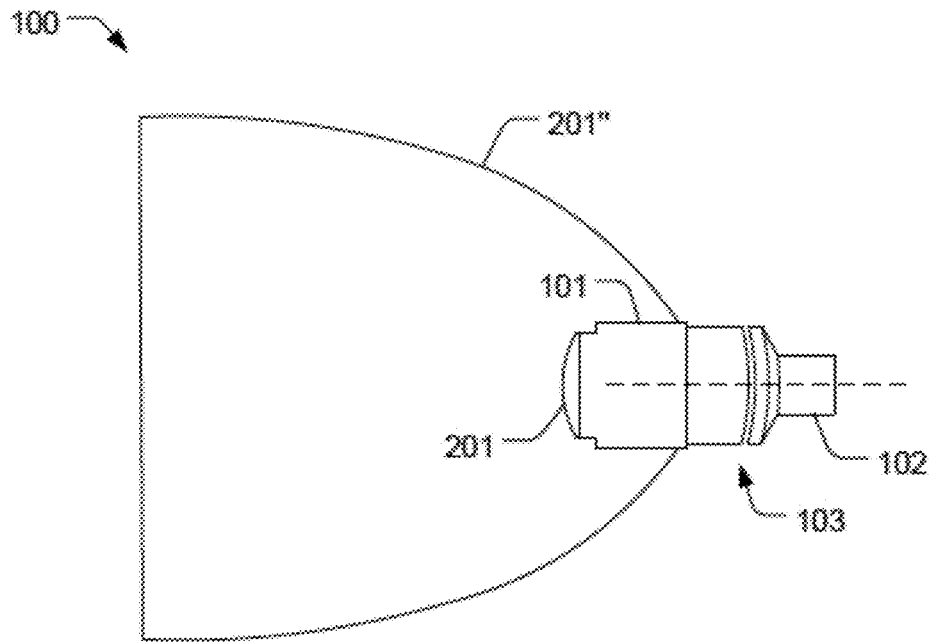
FIGS. 3a and 3b are schematic illustrations, in cross-sectional side views, of a lighting system according to examples of the disclosure.
Figure 3B:
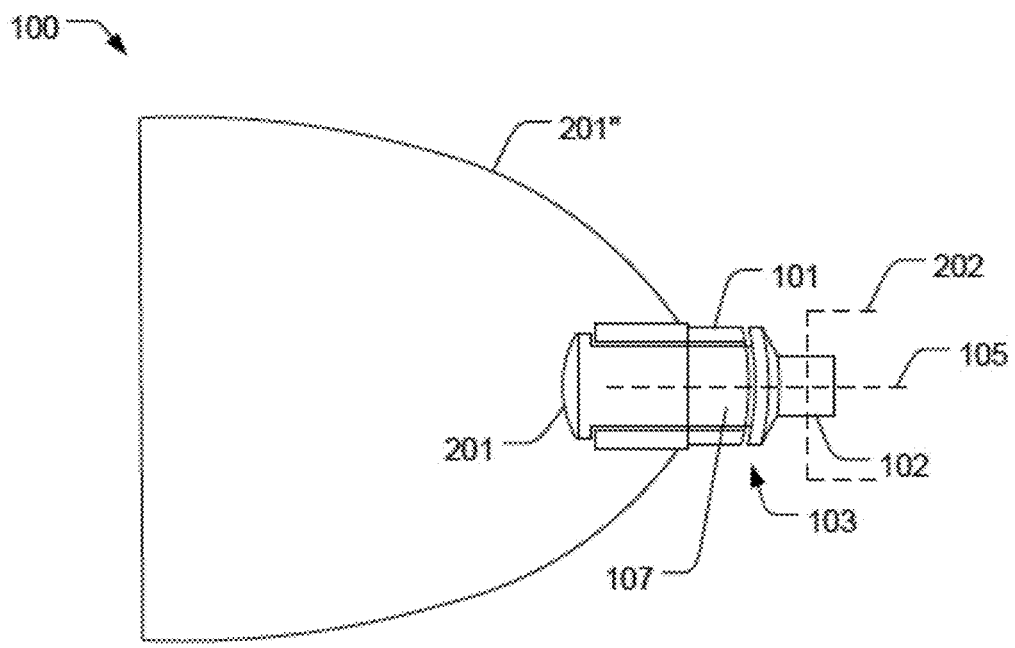
Figure 7:
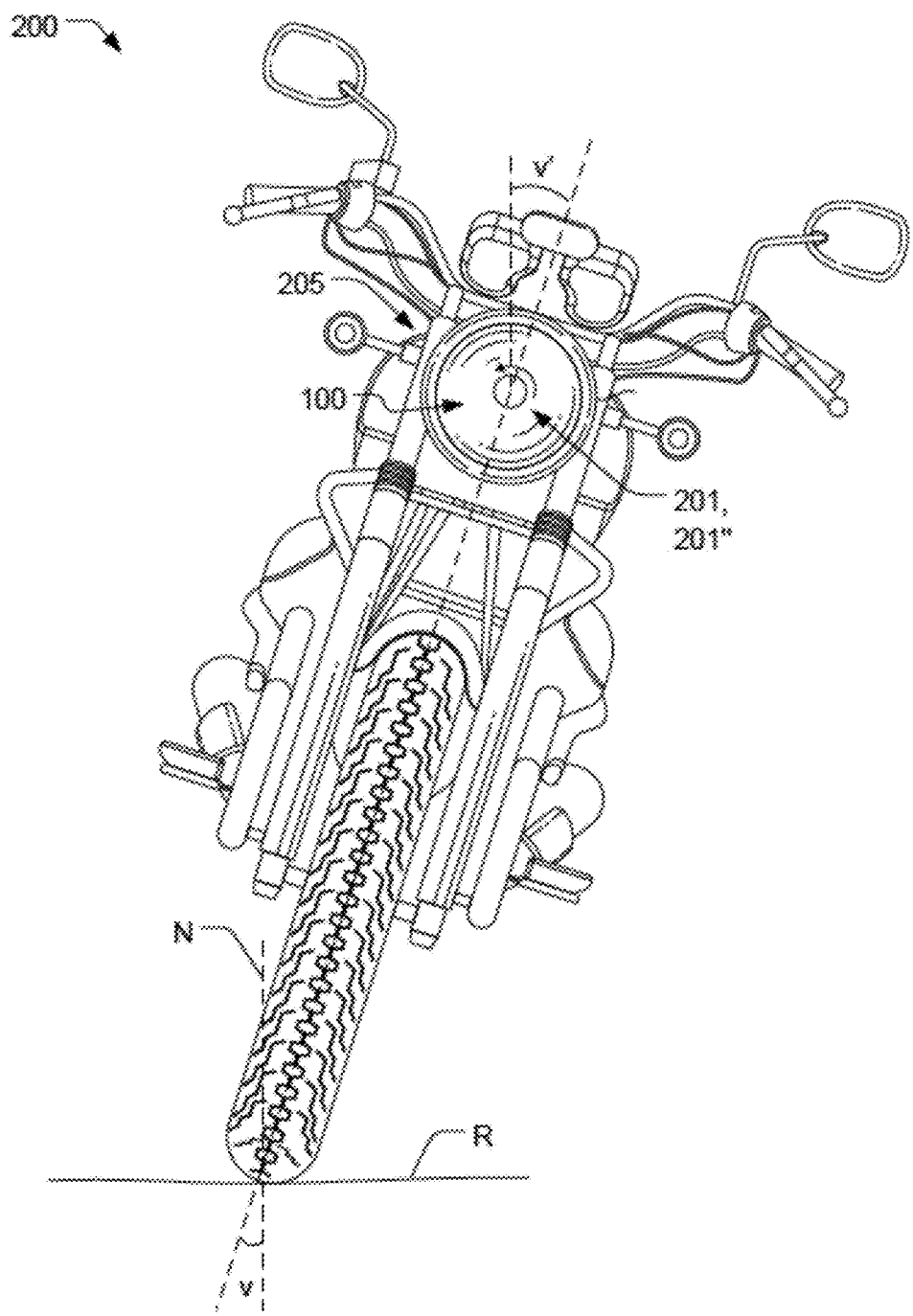
FIG. 7 is a schematic illustration of a lighting system according to an example of the disclosure mounted to a motorcycle.

FIG. 1 is a schematic illustration of a lighting system 100 for a leaning vehicle 200, such as a motorcycle, exemplified in FIG. 7. The lighting system 100 comprises a pivot frame 101 configured to be fixed to a light emitting and/or light reflective device 201, 201', 201", as described further in relation to FIGS. 1-5. In the example of FIG. 1, the pivot frame 101 is fixed to the light reflective device 201". The light emitting device 201 is also attached to the pivot frame 101 in FIG. 1, while FIG. 3*b* shows an example where the pivot frame 101 is attached to the light reflective device 201" and not the light emitting device 201. In all examples as schematically illustrated in FIGS. 1-5, and 7-9, it is conceivable that the light reflective device 201" and/or the light emitting device 201, 201' is removably attachable to the pivot frame 101. Removable attachment may be provided by threads, screws, bolts, clamps, connectors, pins, or other engagement mechanisms. Thus, the light reflective device 201" and/or the light emitting device 201, 201' may be fixed to the pivot frame 101 by attachment thereto, and also removed from the pivot frame 101. The advantageous benefits as described in more detail below are enabled by the lighting system 100 according to the first aspect regardless if the light reflective device 201" and/or the light emitting device 201, 201' is attached to the pivot frame 101 or not before the lighting system 100 is mounted to the leaning vehicle 200. The light reflecting device 201" may comprise different types and combinations of reflecting surfaces for directing the light from the light emitting device 201, 201' according to a desired pattern. The light reflecting device 201" may also comprise a lens or projection elements (not shown) for projecting the light from the light emitting device 201, 201' according to a desired illumination pattern on the road surface (R). The light reflecting device 201" is only schematically illustrated in FIGS. 1-5 and it should be understood that the light reflecting device 201" may have various shapes and configurations while being fixed or attachable to the pivot frame 101. The lighting system 100 provides for the advantageous benefits as described in the present disclosure for any such variations of the light reflecting device 201". The light emitting device 201, 201' may comprise a luminescent light source such as a LED or laser light source, or a gas-discharge lamp, such as xenon lamp, or an electrical gas-discharge lamp, such as a high-intensity discharge lamp (HID lamp), or any combination thereof. The lighting system 100 provides for the advantageous benefits as described in the present disclosure for any such variations of the light emitting device 201, 201'.

The lighting system 100 comprises a mount 102 configured to be fixed to a light fitting 202 of a leaning vehicle, such as a motorcycle 200. The example of FIG. 1 shows only a schematic light fitting or connector 202. The mount 102 may be configured to engage with such fitting 202 e.g. by a connecting element comprising threads, screws, bolts, clamps, connectors, pins, or other engagement mechanisms, to provide a fixed position of the mount 102 relative the leaning vehicle 200. The mount 102 may be configured for removably attaching the lighting system 100 to the light fitting 202 of a headlight assembly 205 of the leaning vehicle 200, e.g. by any of the mentioned engagement mechanisms. The mount 102 may comprise a threaded rod in some examples for a facilitated mounting, by screwing the threaded rod into a corresponding female threaded opening of the fitting 202. It is conceivable that the lighting system 100 can be mounted in a wide range of headlight assemblies 205 and also be utilized as any other light source on the vehicle 200 for improving driver safety, such as an auxiliary light source mounted to the vehicle 200. Any plurality of the lighting system 100 as described in the present disclosure may be combined in a plurality of light sources, such as a plurality of headlight assemblies and/or a plurality of auxiliary lights.

The lighting system 100 comprises a motor 103 attached to the pivot frame 101 and the mount 102. The motor 103 is configured to provide rotational movement of the pivot frame 101 relative to the mount 102, as schematically indicated with opposing arrows at the motor 103 in FIG. 1. The light emitting device 201, 201' and/or the light reflective device 201" is thus able to rotate relative the mount 102. The lighting system 100 comprises a controller 104 in electrical communication with the motor 103. The controller 104 is configured to receive sensor data of a leaning angle (v) of the leaning vehicle 200, such as indicated for the leaning motorcycle in FIG. 7. The sensor data may be provided by motion sensor components already connected to the electrical system 204 of the motorcycle, and/or the sensor data may be provided by a motion sensor 106 connected to the lighting system 100 as described further below with reference to e.g. FIGS. 2*a-b*. It is conceivable that the sensor data is communicated to the controller 104 through a wired connection or via wireless data transmission over various electromagnetic communication frequencies. The controller 104 may be integrated with the motor 103 or connected to the mount 102, or the pivot frame 101. Alternatively, the controller 104 may be attached to any component of the leaning vehicle 200 and configured to communicate with the motor 103 through a wired or wireless connection. In the latter case, the motor 103 may comprise a receiver (not shown) to receive control instructions from the controller 104. The controller 104 is thus configured to control the motor 103 to rotate the pivot frame 101 to a desired angle relative to the mount 102 based on the leaning angle (v). The controller 104 may be configured to rotate the pivot frame 101 angle relative to the mount 102 so that a defined level position of the pivot frame 101 relative the road surface (R) is maintained. Hence, if the level position is defined at v=0 degrees, relative a normal (N) of the surface (R) in the example of FIG. 7, the controller 104 may be configured to rotate the pivot frame 101 relative the mount 102 with an angle (v') that cancels out any deviation from such level position, e.g. by rotating the pivot frame 101 with an angle v'=−v if the motorcycle 200 leans with an angle v from the level position. The mount 102 is assumed to have a fixed relationship to the motorcycle 200. It is conceivable however that the controlled 104 may be configured to apply any off-set value (W) to the angle (v') by which the pivot frame 101 is rotated relative the mount 102 for any given angle (v) by which the motorcycle 200 leans; e.g. v'=−v±W. For example, it may be desired to overcompensate or undercompensate the leaning motion of the motorcycle 200 in some applications or situations. It is further conceivable that such compensation may be a linear or non-linear function (f) of the leaning angle (v), i.e. v'=f(v), where the function (f) may in addition take into account any motion characteristics (m) of the leaning vehicle 200, such as speed and acceleration in three dimensions; v'=f(v,m). The controller 104 may thus be configured to determine the desired angle (v') as a function of the leaning angle (v) and motion characteristics of the leaning vehicle 200. It is also conceivable that the controller 104 is configured to determine the angle v' based on other sensor data such as environmental or ambient data, e.g. ambient light conditions when driving the vehicle 200, to provide for further optimization of the illumination of the road to the driving conditions.

Hence, since the light emitting device 201, 201' and/or the light reflective device 201" is attached to the pivot frame 101 when the lighting system 100 is mounted to the motorcycle 200 and rotates along with the rotation angle (v') of the pivot frame 101, the light pattern and characteristics may be optimized for the driver regardless of the leaning angle (v) of the vehicle 200. Having a pivot frame 101 configured to be fixed to the light emitting and/or light reflective device 201, 201', 201", a mount 102 configured to be fixed to a light fitting 202 of a leaning vehicle 200, and a motor 103 attached to the pivot frame 101 and the mount 102 to rotate the pivot frame 101 relative to the mount 102 in response to sensor data of a leaning angle (v) of the leaning vehicle 200 provides for a particularly compact light system 100 with few components, which facilitates fit or retrofit to a wide range of headlight assemblies. As described, the lighting system 100 provides for a highly adaptable light which allows for taking into account a wide range of driving and vehicle characteristics.

Figure 4A:
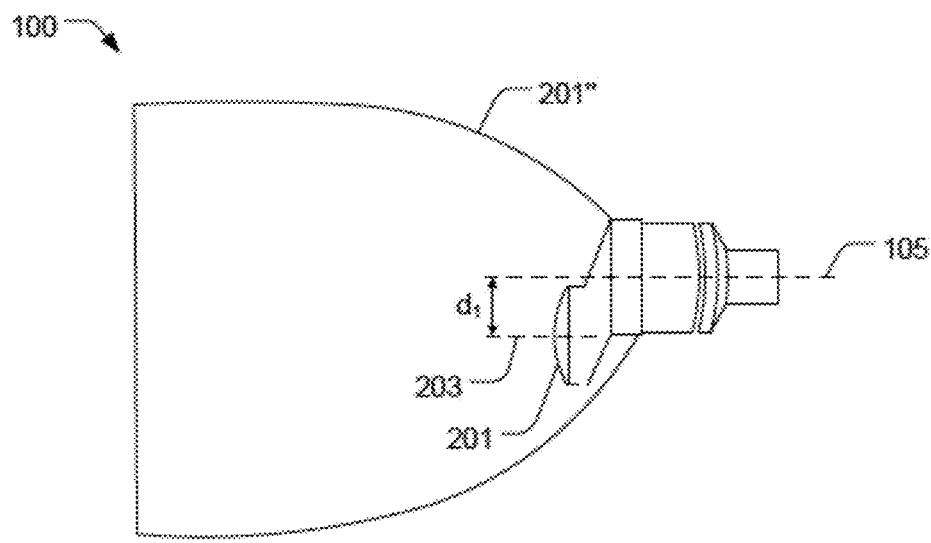
FIGS. 4a and 4b are schematic illustrations, in cross-sectional side views, of a lighting system according to examples of the disclosure.

The pivot frame 101 may be configured to be fixed to a light emitting device 201, 201' configured to emit light along an optical axis 203, 203'. The pivot frame 101 may be rotatable around a pivot axis 105 relative to the mount 102. The pivot axis 105 corresponds to the rotational axis of the motor 103. The examples of FIGS. 1 and 4a illustrate an optical axis 203 of the light emitting device 201 and a pivot axis 105 of the pivot frame 101. The pivot axis 105 may be parallel with the optical axis 203, as further illustrated in FIGS. 1 and 4a. This provides for an effective manipulation of the light pattern over a wide range of driving conditions, while fit or retrofit to a wide range of headlight assemblies may be facilitated.

The optical axis 203 may be essentially concentric with the pivot axis 105, i.e. concentric with the rotational axis of the motor 103, as exemplified in FIG. 1. Thus, the mount 102 and the pivot frame 101 may be connected to opposite rotational ends of the motor 103 for respective rotation around its pivot axis 105. This provides for a compact lighting system 100 with a minimized footprint in the vertical direction, perpendicular to the pivot axis 105. This may be particularly advantageous in small headlight assemblies where mounting space is limited. The pivot frame 101 may correspond to a base portion 101 of the light emitting device 201, 201' and/or the light reflective device 201". I.e. the motor 103 may, in one example, be connected directly at one of its rotational ends to the base portion 101 of the light emitting device 201, 201' and/or the light reflective device 201". E.g., in FIG. 8a, the element denoted with reference numeral 101 may be a pivot frame 101 as described above, and may in a further example correspond to a base portion 101 of the light reflective device 201". This may further provide for a particularly compact lighting system 100.

Figure 4B:
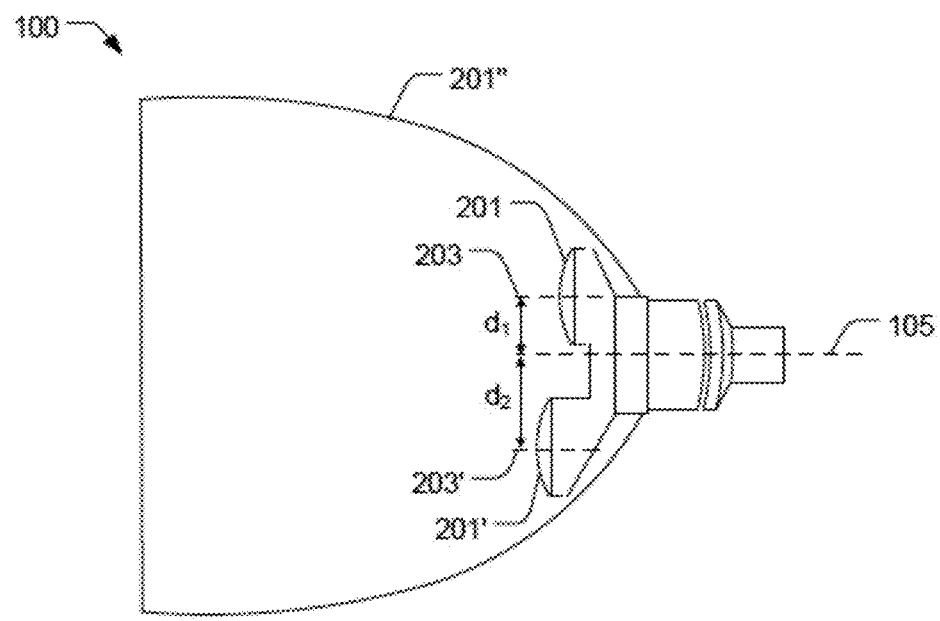

In another example, the optical axis 203, 203' is off-set from the pivot axis 105 with an off-set distance (d1, d2) in a direction perpendicular to the pivot axis 105, as seen in FIGS. 4a-b. Providing for an off-set optical axis 203 as exemplified in FIG. 4a allows for utilizing the adaptable lighting of the lighting system 100 as explained above for a wider range of optical configurations and headlight assemblies. This also facilitates utilizing a plurality of light emitting devices 201, 201' for such adaptive lighting. This is exemplified in FIG. 4b where two light emitting devices 201, 201' and associated optical axes 203, 203' are arranged with respective off-set distances (d1, d2) from the pivot axis 105. It is conceivable that any plurality of light emitting devices 201, 201' may be utilized in this manner.

Although the aforementioned examples show the optical axis 203, 203' arranged in parallel with the pivot axis 105, it is conceivable that, in some applications, it may be advantageous to arrange the optical 203, 203' with an angle from the pivot axis 105.

The lighting system 100 may comprise a sensor 106 configured to detect the aforementioned leaning angle (v) of the leaning vehicle 200 and send the sensor data to the controller 104. The sensor 106 may be integrated with the lighting system 100 which provides for a facilitated retro-fitting to existing headlight assemblies as well as a more compact and robust lighting system 100. The sensor 106 may be integrated with the lighting system 100 by being attached to the pivot frame 101 or the mount 102 as shown in FIGS. 2a-b, or to the motor 103 itself. The sensor 106 being integrated with the lighting system 100 may also be construed as the controller 104 being in communication with a dedicated sensor 106 providing the aforementioned sensor data to the controller 104, hence facilitating replacement of standard non-adaptive lights with the lighting system 100.

The sensor 106 may be attached to the pivot frame 101, as schematically shown in the example of FIG. 2a. This provides for a compact lighting system 100 and facilitated retrofit as elucidated above. Having the sensor 106 attached to the pivot frame 101 may be particularly advantageous in installations where the available space around the mount 102 is limited. The sensor 106 may thus rotate along with the pivot frame 101. This may provide for improved sensor performance 106 in some situations, since the sensor 106 may be kept at the defined level. It is further conceivable that the sensor 106 may comprise multiple sensors such as an ambient sensor, or a sensor for speed and acceleration detection, in addition to detection of leaning angle (v). The performance of such sensor may in some applications be improved if the sensor is kept level during driving the vehicle 200. The sensor 106 in communication with the controller 104 may thus be configured to compare its current leaning angle with a desired angle, e.g. a horizontal level position, and send instructions to the motor 103 to rotate the pivot frame 101 and the sensor 106 attached thereto, so that the sensor 106 assumes a position corresponding to the desired angle.

Alternatively, the sensor 106 may be attached to the mount 102, as schematically shown in FIG. 2b. The sensor 106 may also be integrated with the motor 103, either to the portion of the motor rotating with the pivot frame 101, or to the portion of the motor rotating with the mount 102.

The mount 102 may comprise a connector 107 configured for attachment to the light emitting device 201, as schematically illustrated in FIG. 3b. The connector 107 extends from the light emitting device 201 to the portion of the mount 102 engaging with the fitting 202 of the vehicle 200. Thus, in this example, the light emitting device 201 has a fixed position in relation to the vehicle 200. The pivot frame 101 is configured to be fixed to the light reflective device 201". The light reflective device 201" is thus rotatable relative the light emitting device 201 by the motor 103. This may provide for a facilitated integration with some headlight assemblies when fitting or retrofitting the lighting system 100 thereto. A stationary light emitting device 201 may for example facilitate the electrical connection to the electrical system of the vehicle 200.

The connector 107 may be concentrically aligned with the pivot axis 105 of the pivot frame 101, as exemplified in FIG. 3b. This provides for a compact lighting system 100 as described above.

The lighting system 100 may comprise a secondary light emitting device 201' fixed to the pivot frame 101, as shown in the example of FIG. 4b. It is to be understood that any plurality of light emitting devices 201, 201' may be fixed to the pivot frame 101 as described above.

The lighting system 100 may comprise the aforementioned light reflective device 201". The light reflective device 201" is attached to the pivot frame 101. The light reflective device 201" may be integrated with the pivot frame 101, which may provide for a particularly robust and compact lighting system 100. The pivot frame 101 may be configured to be fixed to the light emitting device 201, 201'. The light emitting device 201, 201' and the light reflective device 201" are thus rotatable relative the mount 102 by the motor 103.

The lighting system 100 may comprise an electrical connection interface 108 configured to connect to an electrical system 204 of the leaning vehicle 200 for communication between the electrical system 204 and the controller 104 to receive the aforementioned sensor data, as described above and schematically illustrated in FIG. 1. The sensor data may thus be received via sensors already connected to the electrical system 204 of the vehicle 200.

The electrical connection interface 108 may also be configured to allow for communication between the electrical system 204 and the light emitting device 201, 201', i.e. to control the power to the light emitting device 201, 201'. In one example, the controller 104 may be configured to control the power output to the light emitting device 201, 201', e.g. to vary the amount of light in dependence on the sensor data. It may be desirable for example to increase the light output momentarily as the motorcycle leans into a curve in the road. The controller may thus be configured to control a power output to the light emitting device 201, 201', based on the leaning angle (v).

Figure 6:
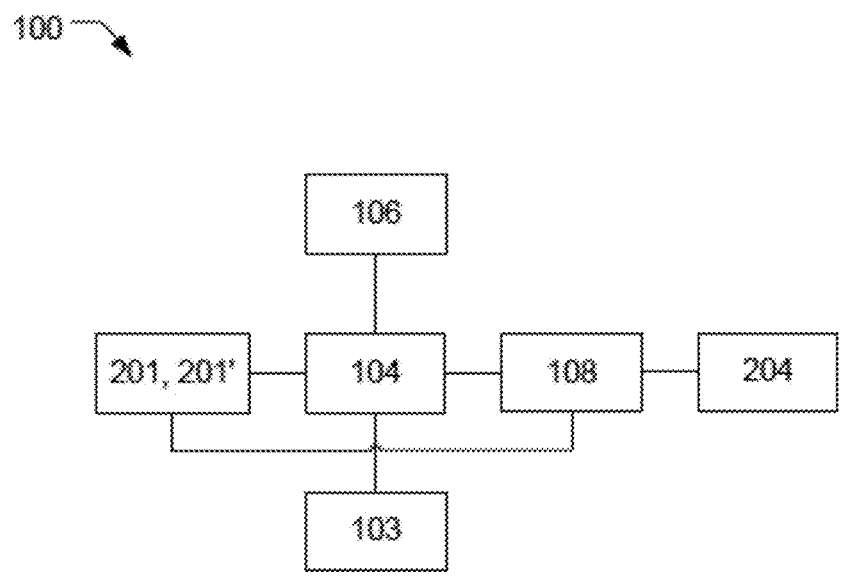
FIG. 6 is a schematic diagram of a lighting system according to an example of the disclosure.

FIG. 6 is a schematic diagram of a lighting system 100 according to an example. The sensor 106 and the motor 104 are in communication with the controller 104. An electrical connection interface 108 may connect to an electrical system 204 of the leaning vehicle 200, to allow for electrical communication with the controller 104 and/or the light emitting device 201, 201'. The controller 104 may also communicate with the light emitting device 201, 201', as mentioned above.

The motor 103 may be concentrically arranged with respect to the pivot frame 101. A width (w1) of the motor 103, in a direction perpendicular to the pivot axis 105 of the pivot frame 101 may be at the most 50% wider than a width (w2) of the pivot frame 101 and/or a light emitting device 201 connected to the pivot frame 101. This provides for a compact lighting system 100 for facilitated integration in a wide range of different headlight assemblies 205.

Figure 5A:
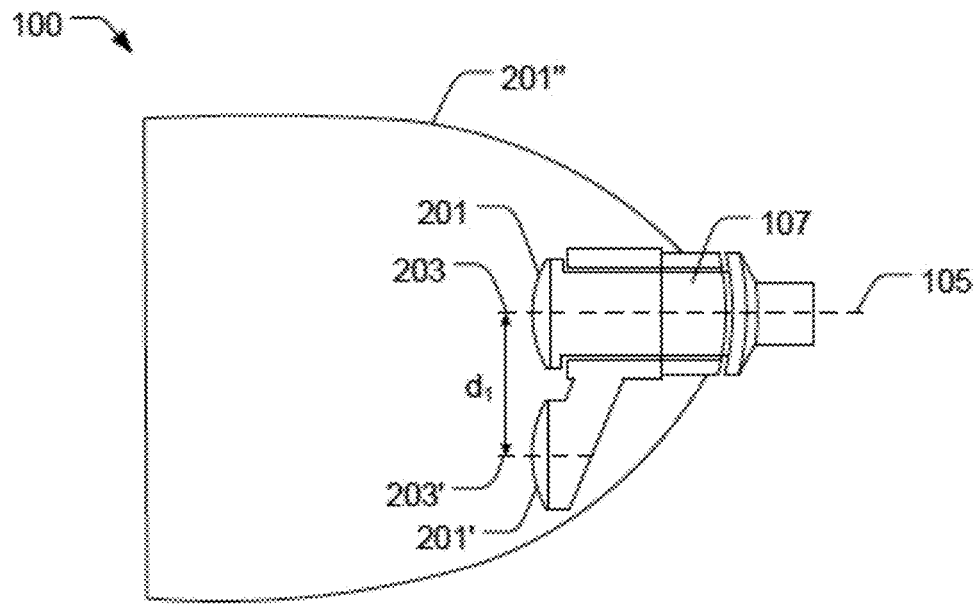
FIGS. 5a and 5b are schematic illustrations, in cross-sectional side views, of a lighting system according to examples of the disclosure.
Figure 5B:
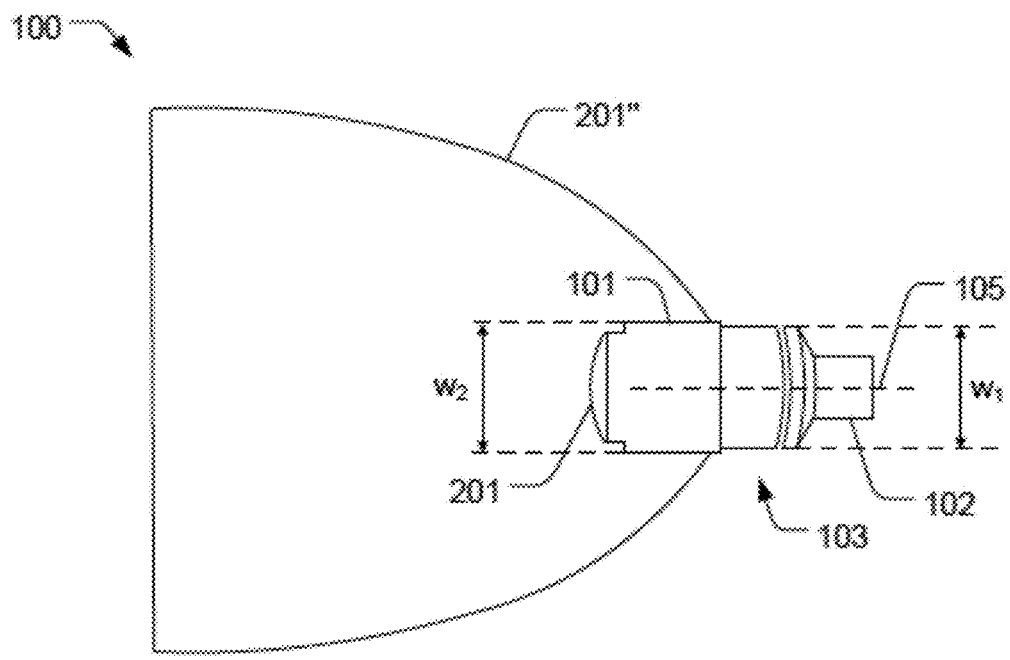

The width (w1) of the motor 103, in a direction perpendicular to a pivot axis 105 of the pivot frame 101, may correspond essentially to, or be less than, the width (w2) of the pivot frame 101 and/or a light emitting device 201 connected to the pivot frame 101. The example in FIG. 5b shows the width (w1) of the motor 103 corresponding essentially to the width (w2) of the pivot frame 101 and/or a light emitting device 201. This provides for a particularly facilitated integration in various headlight assemblies 205. The lighting system 100 may thus readily replace standard, non-adaptive lighting by removal of the standard light source in the headlight assembly 205 and connecting the mount 102 of the lighting system 100 in the standard light source fitting 202. The width of the motor 103 may in one example be at the most 30 mm for such facilitated retrofit, or facilitated integration in the manufacturing of a wide range of compact headlight assemblies 205.

The motor 103 may be a gimbal motor. It is conceivable that various types of motors 103 may be arranged to connect the mount 102 and the pivot frame 101, such as stepper or servo motors. The motor 103 may be a brushless motor optimized for quick response and instant changes in rotational direction. The compact arrangement realized by the lighting system 100, particularly in the examples where the optical axis 203 is aligned with the pivot axis 105, allows for minimizing the required torque, i.e. the weight that needs to be pulled by the motor 103 for the pivoting motion. This allows the use of a compact gimbal motor 103, which further adds to the compactness of the lighting system 100. The gimbal motor 103 may be optimized for rapid and accurate response within a defined angular interval relevant to the level adjustment of the vehicle 200.

The lighting system 100 may comprise the light emitting device 201, 201'. The light emitting device 201, 201' may be attached to the pivot frame 101 and in electrical communication with the electrical connection interface 108 via an electrical connector attached to the pivot frame 101. The light emitting device 201, 201' may be a long-life light source such as a LED attached to the pivot frame 101, and which may have a permanently connection to the connection interface 108, to be connected to the electrical system 204 of the vehicle 204. This provides for a particular compact and light-weight lighting system 100. It is, however, conceivable that such light emitting device 201, 201' and its connection interface 108 may be removably attached to the pivot frame 101 to allow for a facilitated exchange to e.g. LED's with different illumination level output. In one example, the light emitting device 201, 201' comprises a light source configured to be connected to a socket of an electrical connector attached to the pivot frame 101, in which case the light emitting device 201, 201' is removably attached to such electrical socket.

Figure 8A:
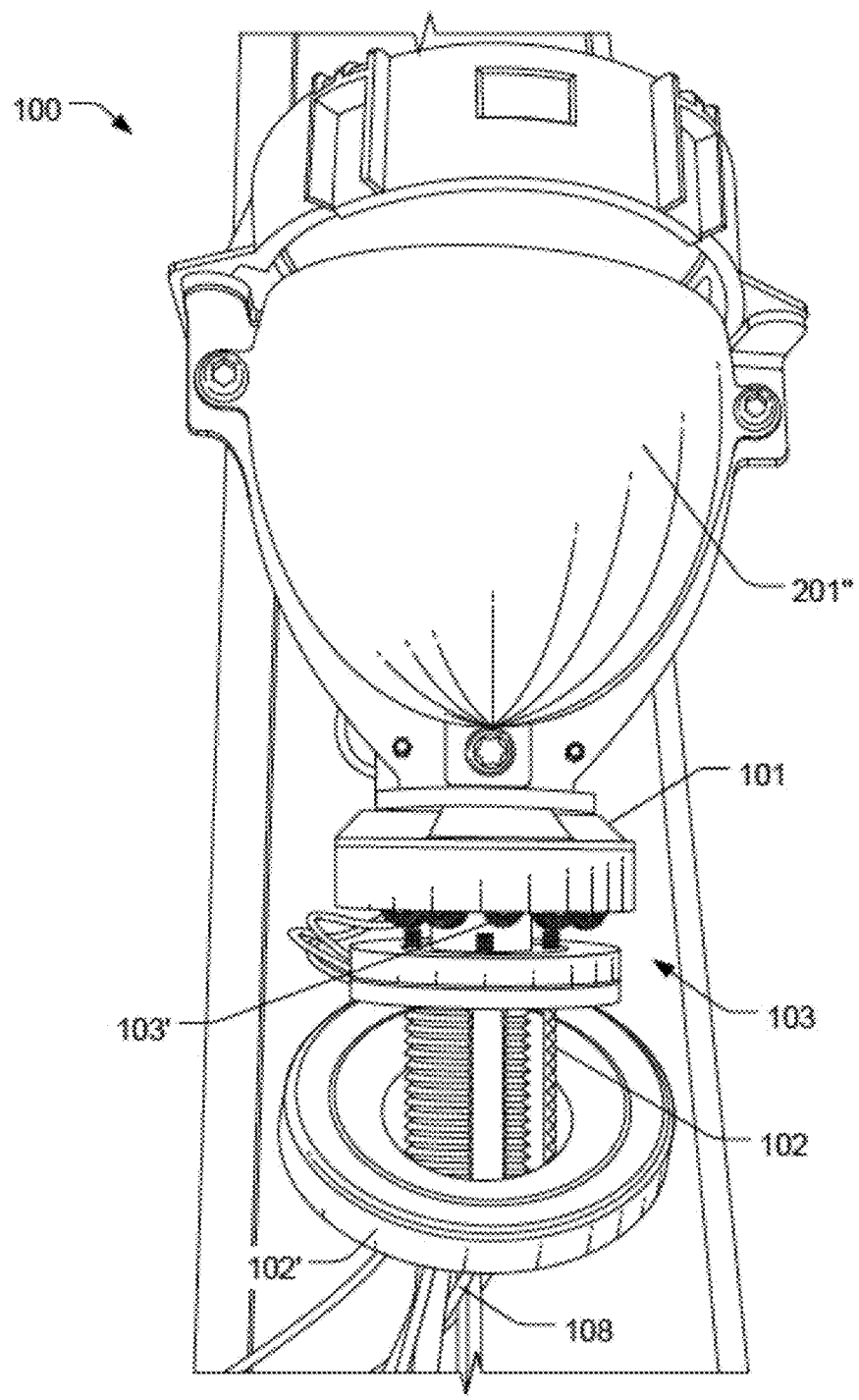
FIGS. 8*a* and 8*b* are schematic illustrations, in perspective views, of a lighting system according to examples of the disclosure.
Figure 8B:
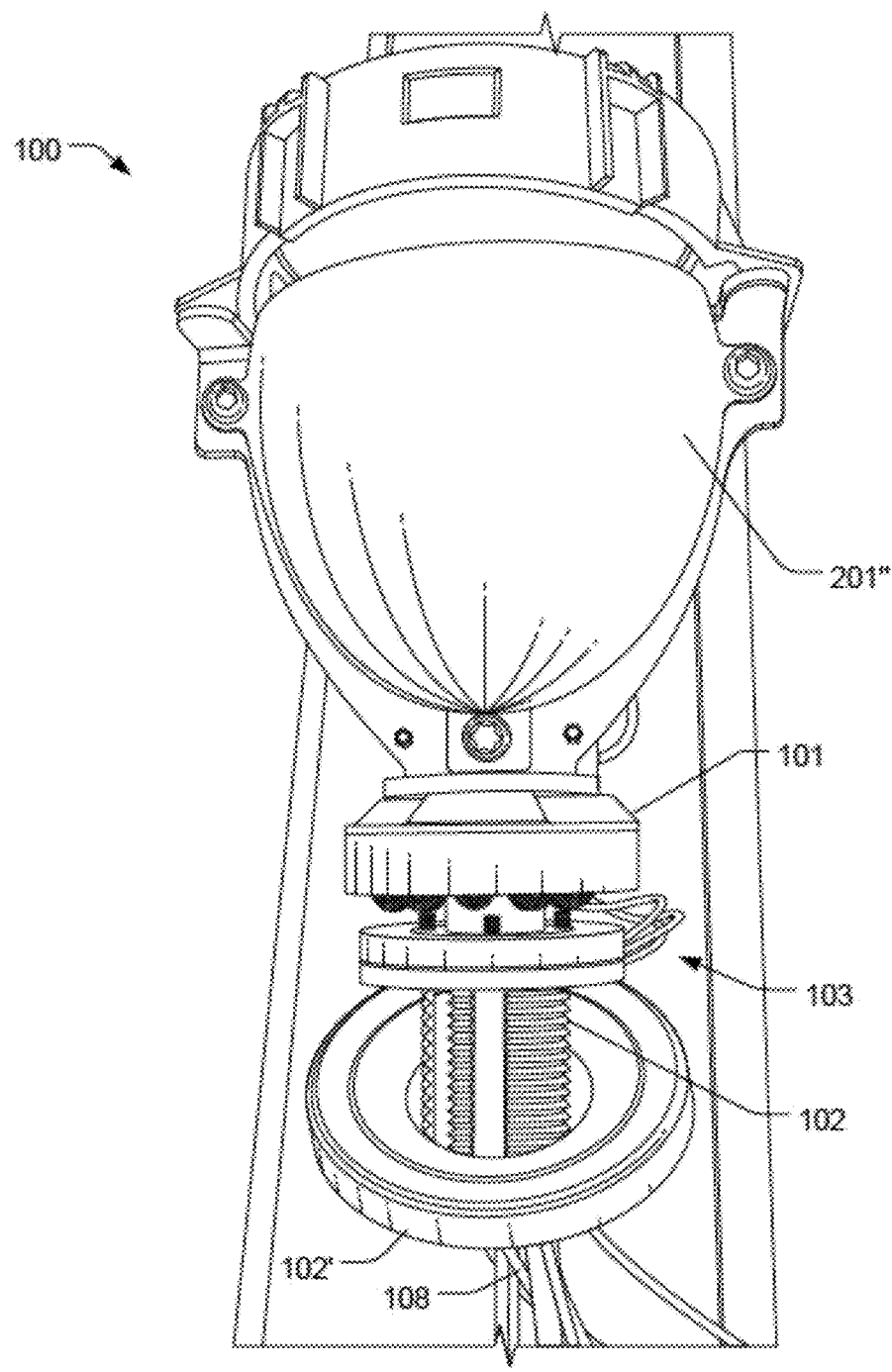
Figure 9:
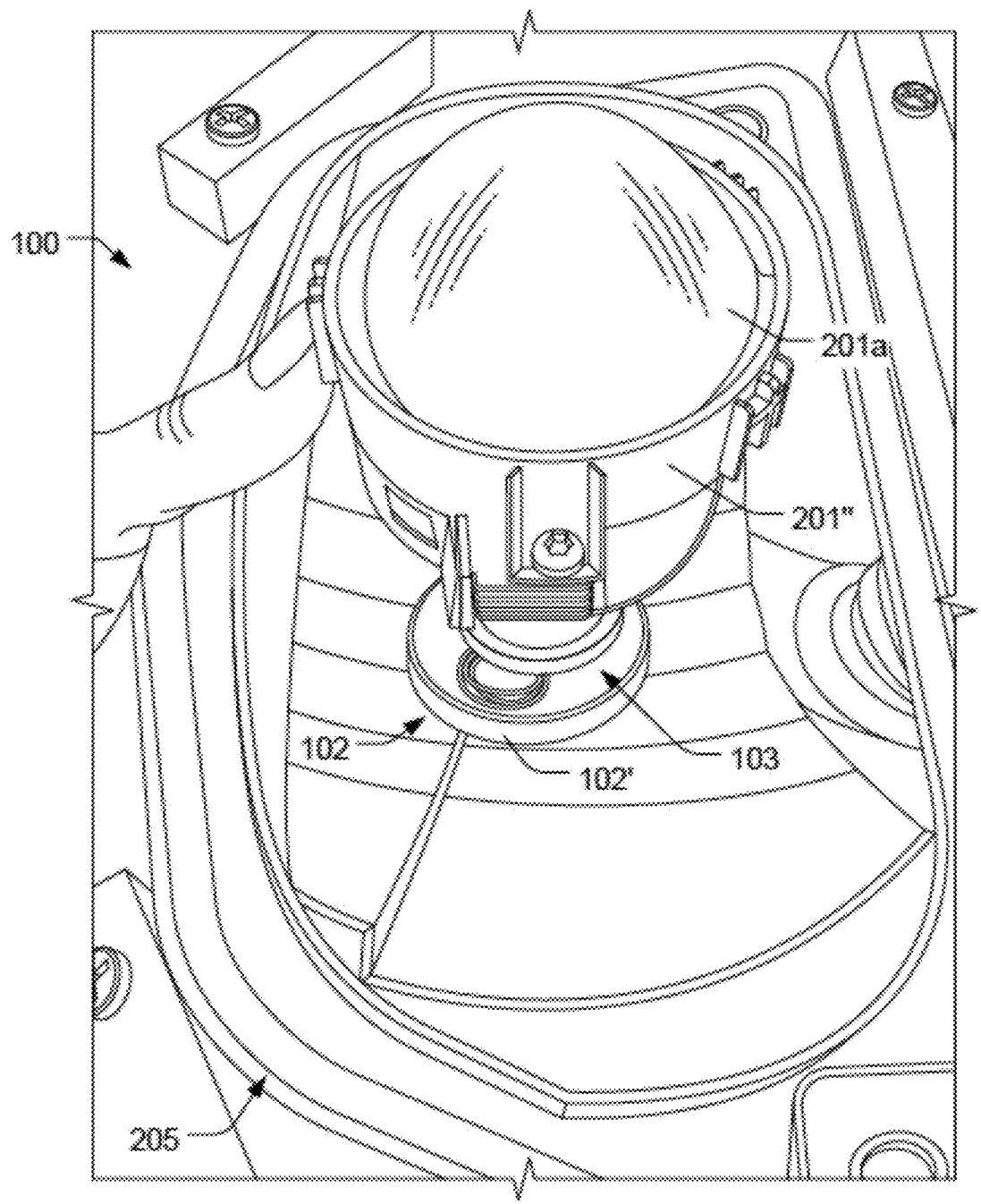
FIG. 9 is a schematic illustration, in a perspective view, of a lighting system according to an example of the disclosure.

FIGS. 8a-b are illustrations of further examples of the lighting system 100. E.g. FIG. 8a shows a mount 102 comprising a rod, such as a threaded rod, to be fixed to a corresponding fitting 202 of a vehicle 200. The mount 102 or rod is connected to the motor 103 which is connected at its other side to the pivot frame 101. A rotatable interior 103' of the motor 103 is indicated. The reflector 201" is attached to the pivot frame 101 to allow for rotation of the reflector 201" relative the mount 102. Wires of the electrical connection interface 108 are arranged through the mount 102, i.e. in the interior of the rod. The compact arrangement of the mount 102, motor 103 and pivot frame 101 provides for a facilitated mounting of the lighting system 100 to a wide range of existing headlight assemblies. The mount 102 may be varied to fit a plurality of different motorcycles 200. FIG. 8b show another view of the lighting system 100, where the reflector 201" has been rotated slightly relative the mount 102, compared to the illustration in FIG. 8a. Although element 201" is referred to as a reflector or light reflective device 201", it is to be understood that various outside housing components may be arranged to enclose the actual light directing elements of the light reflective device 201". FIGS. 8a-b, and FIG. 9 show examples of such housing components. The light reflective device 201" or any housing components enclosing the latter may be mounted directly to the motor 103, as described above, i.e. the pivot frame 101 may correspond to a base portion of the light reflective device 201" or any of the aforementioned housing components. The illustration in FIG. 9 shows an example of a housing of a headlight assembly 205 in which the lighting system 100 may be mounted. The mount 102 may comprise a plate 102' arranged to facilitate a secure fit of the lighting system 100. As mentioned above, the light reflective device 201" may comprise any reflective or optical components to direct the light from the light emitting element 201, 201' to the road surface with a desired illumination pattern. The light reflective device 201" may e.g. comprise a lens or light projecting element 201a, as illustrated in the view in FIG. 9, which accordingly is rotated relative the mount 102 as described above.

Figures 10A, 10B:
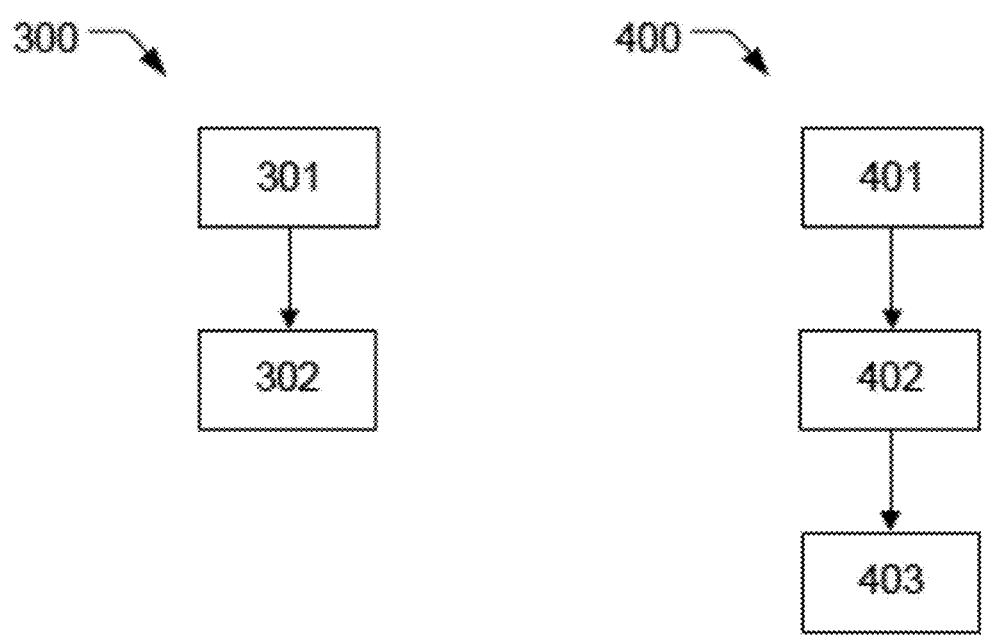
FIG. 10*a* is a flowchart of a method of lighting control in a lighting system according to an example of the disclosure.
FIG. 10*b* is a flowchart of a method of lighting control in a lighting system according to an example of the disclosure.

FIG. 10a is a flowchart of a method 300 of lighting control in a lighting system 100 for a leaning vehicle 200. The lighting system 100 comprises a pivot frame 101 configured to be fixed to a light emitting and/or light reflective device 201, 201', 201", a mount 102 configured to be fixed to a light fitting 202 of a leaning vehicle 200, and a motor 103 attached to the pivot frame 101 and the mount 102. The motor 102 is configured to provide rotational movement of the pivot frame 101 relative to the mount 102, as explained above. The method 300 comprises receiving 301 sensor data of a leaning angle (v) of the leaning vehicle 200, and rotating 302 the pivot frame 101 to a desired angle (v') relative to the mount 101 based on the leaning angle (v). The method 300 thus provides for the advantageous benefits as described above for the lighting system 100 and FIGS. 1-9.

FIG. 10b is a flowchart of a method 400 of providing lighting for a leaning vehicle 200. The method 400 comprises providing 401 a lighting system 100 comprising a pivot frame 101 configured to be fixed to a light emitting and/or light reflective device 201, 201', 201", a mount 102 configured to be fixed to a light fitting 202 of a leaning vehicle 200, and a motor 103 attached to the pivot frame 101 and the mount 102. The motor 103 is configured to provide rotational movement of the pivot frame 101 relative to the mount 102, securing 402 the mount to a light fitting 202 of the leaning vehicle 200. The method 400 comprises connecting 403 an electrical connection interface 108, in communication with a controller 104 and/or in communication with the light emitting device 201, 201', to an electrical system 204 of the leaning vehicle 200. The controller 104 is configured to control the motor 103 to rotate the pivot frame 101 to a desired angle (v') relative to the mount 102 based on sensor data of a leaning angle (v) of the leaning vehicle 200.

From the description above follows that, although various embodiments of the invention have been described and shown, the invention is not restricted thereto, but may also be embodied in other ways within the scope of the subject-matter defined in the following claims.

The invention claimed is:

1. A lighting system for a leaning vehicle, said lighting system comprising:
a pivot frame configured to be fixed to a light emitting and/or light reflective device;
a mount configured to be fixed to a light fitting of a leaning vehicle;
a motor attached to the pivot frame and the mount, wherein the motor is configured to provide rotational movement of the pivot frame relative to the mount; and
a controller in electrical communication with the motor and being configured to receive sensor data of a leaning angle of the leaning vehicle,
wherein the controller is configured to control the motor to rotate the pivot frame to a desired angle relative to the mount based on the leaning angle.

2. The lighting system of claim 1, wherein:
the pivot frame is configured to be fixed to a light emitting device configured to emit light along an optical axis,
the pivot frame is rotatable around a pivot axis relative to the mount, and
the pivot axis is parallel with the optical axis.

3. The lighting system of claim 2, wherein the optical axis is essentially concentric with the pivot axis.

4. The lighting system of claim 2, wherein the optical axis is off-set from the pivot axis with an off-set distance in a direction perpendicular to the pivot axis.

5. The lighting system of claim 1, further comprising a sensor configured to detect said leaning angle of the leaning vehicle and send said sensor data to the controller.

6. The lighting system of claim 5, wherein the sensor is attached to the pivot frame.

7. The lighting system of claim 5, wherein the sensor is attached to the mount.

8. The lighting system of claim 1, wherein:
the mount comprises a connector configured for attachment to the light emitting device and
the pivot frame is configured to be fixed to the light reflective device, whereby the light reflective device is rotatable by the motor relative the light emitting device.

9. The lighting system of claim 8, wherein the connector is concentrically aligned with a pivot axis of the pivot frame.

10. The lighting system of claim 8, comprising a secondary light emitting device fixed to the pivot frame.

11. The lighting system of claim 1, comprising said light reflective device, wherein:
the light reflective device is attached to the pivot frame and
the pivot frame is configured to be fixed to the light emitting device, whereby the light emitting device and the light reflective device are rotatable by the motor relative the mount.

12. The lighting system of claim 1, further comprising an electrical connection interface configured to connect to an electrical system of the leaning vehicle for communication between the electrical system and the controller to receive said sensor data, and/or for communication between the electrical system and the light emitting device.

13. The lighting system of claim 1, wherein the mount is configured for removably attaching the lighting system to the light fitting of a headlight assembly of the leaning vehicle.

14. The lighting system of claim 1, wherein:
the motor is concentrically arranged with respect to the pivot frame and
a width of the motor, in a direction perpendicular to a pivot axis of the pivot frame, is no more than 50% wider than a width of the pivot frame and/or a light emitting device connected to the pivot frame.

15. The lighting system of claim 1, wherein:
the motor is concentrically arranged with respect to the pivot frame, and
a width of the motor, in a direction perpendicular to a pivot axis of the pivot frame, corresponds essentially to, or is less than, a width of the pivot frame and/or a light emitting device connected to the pivot frame.

16. The lighting system of claim 1, wherein the motor is a gimbal motor.

17. The lighting system of claim 1, comprising said light emitting device and wherein the light emitting device comprises a light source attached to the pivot frame.

18. The lighting system of claim 1, wherein the controller is configured to determine the desired angle as a function of the leaning angle and motion characteristics of the leaning vehicle.

19. The lighting system of claim 1, wherein the controller is configured to control a power output to the light emitting device based on the leaning angle.

20. A method of lighting control in a lighting system for a leaning vehicle comprising a pivot frame configured to be fixed to a light emitting and/or light reflective device, a mount configured to be fixed to a light fitting of the leaning vehicle, and a motor attached to the pivot frame and the mount and being configured to provide rotational movement of the pivot frame relative to the mount, the method comprising:
receiving sensor data of a leaning angle of the leaning vehicle and
rotating the pivot frame to a desired angle relative to the mount based on the leaning angle.

21. A method of providing lighting for a leaning vehicle, the method comprising:
providing a lighting system comprising a pivot frame configured to be fixed to a light emitting and/or light reflective device, a mount configured to be fixed to a light fitting of a leaning vehicle, and a motor attached to the pivot frame and the mount and being configured to provide rotational movement of the pivot frame relative to the mount;
securing the mount to a light fitting of the leaning vehicle; and
connecting an electrical connection interface in communication with a controller and/or in communication with the light emitting device to an electrical system of the leaning vehicle;
wherein the controller is configured to control the motor to rotate the pivot frame to a desired angle relative to the mount based on sensor data of a leaning angle of the leaning vehicle.

* * * * *